No. 700,228. Patented May 20, 1902.
T. O'BRIEN.
CHARCOAL HEATER.
(Application filed Feb. 13, 1902.)
(No Model.)
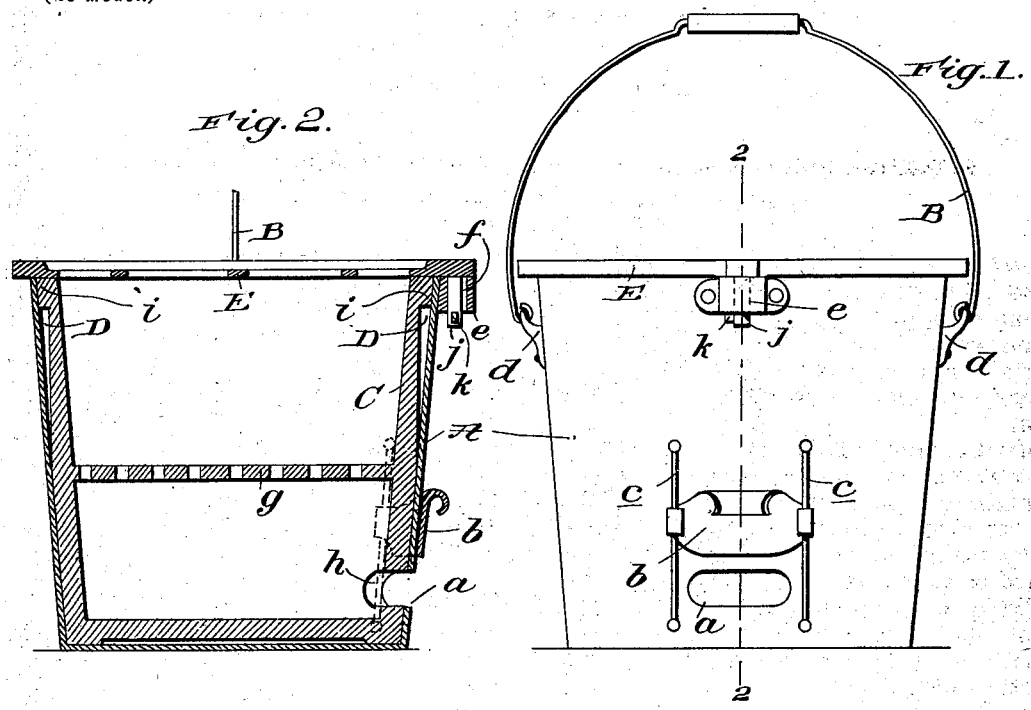
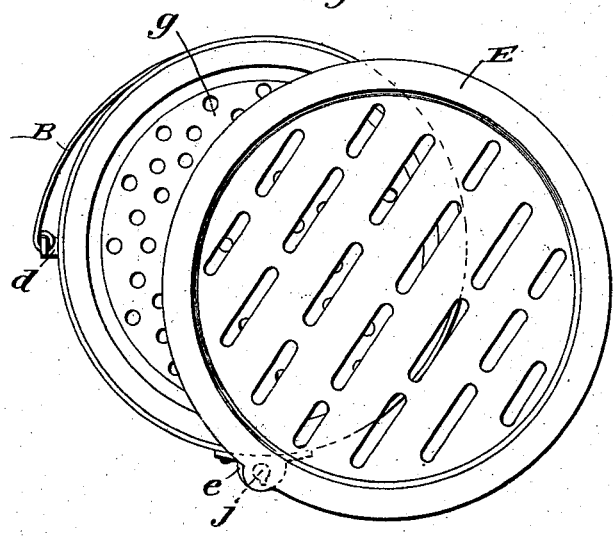
Witnesses
H. Raeder
N. C. Healy
Inventor
T. O'Brien
By James J. Sheehy
Attorney

UNITED STATES PATENT OFFICE.

TIMOTHY O'BRIEN, OF PARIS, CANADA.

CHARCOAL-HEATER.

SPECIFICATION forming part of Letters Patent No. 700,228, dated May 20, 1902.

Application filed February 13, 1902. Serial No. 93,971. (No model.)

*To all whom it may concern:*

Be it known that I, TIMOTHY O'BRIEN, residing at Paris, in the Province of Ontario and Dominion of Canada, have invented new and useful Improvements in Charcoal-Burning Stoves, of which the following is a specification.

My invention relates to charcoal-burning cook-stoves, such as are designed more particularly for use in warm weather; and it has for its general object to provide a compact and portable charcoal-burning stove susceptible of being cleaned with facility and one embodying such a construction that the parts most liable to be burned out or broken may be readily removed and replaced with new parts.

Other advantageous features of the invention will be fully understood from the following description and claims when taken in conjunction with the accompanying drawings, in which—

Figure 1 is a side elevation of my improved stove with the damper in a raised position; Fig. 2, a diametrical section taken in the plane indicated by the line 2 2 of Fig. 1; and Fig. 3, a plan view with the cover partly open.

Similar letters of reference designate corresponding parts in all of the views of the drawings, referring to which—

A is the casing or receptacle of my improved stove, which is preferably made of sheet metal in the shape shown—*i. e.*, tapered or gradually diminished in size toward its lower end like a bucket. This casing is provided adjacent to its lower end with an opening $a$ for the entry of air and the removal of ashes, the said opening being designed to be closed to a greater or less extent by a vertically-movable damper $b$, mounted upon slide-rods $c$, connected at their ends to the casing. The said casing is also provided at diametrically opposite points with ears $d$ for the connection of a swinging bail B, and is further provided adjacent to its upper end and preferably at a point midway between the ears with an exterior lug $e$, having a vertically-disposed keyhole-slot $f$, for a purpose hereinafter pointed out.

C is the combined fire-pot and ash-receptacle of the stove, which is removably placed in the casing A after the manner shown in Fig. 2. The said fire-pot and ash-receptacle is formed of one piece of fire-clay or other suitable fire-resisting material and is provided at an intermediate point of its height with a grate $g$ and at a point adjacent to its bottom with an opening $h$, designed to register with the opening $a$ of the casing. The lower portion of the fire-pot and ash-receptacle is exteriorly of a shape and size to snugly fit within the lower portion of the casing A. The upper portion of the fire-pot and ash-receptacle—*i. e.*, the portion above the grate $g$ and forming the side wall of the fire-pot is, however, exteriorly recessed, so that it is of a less diameter than the interior of the casing A— this in order to provide an air-space D between the upper portion of the fire-pot and ash-receptacle and the casing. The air-space D is arranged below the flange $i$, with which the fire-pot and ash-receptacle is preferably provided; and it has for its purpose to prevent the fire in the fire-pot from injuring the casing A.

E is the cover of the stove. Said cover is preferably of the same shape as the upper end of the casing A, although slightly larger in diameter, and is provided adjacent to its perimeter with a depending stud $j$, having an enlargement $k$ at its lower end. The stud $j$ is designed to be passed through the keyhole-slot $f$ of the lug $e$, as shown in Fig. 2, and when it is in such position it will be observed that the cover may be swung on and off the stove with facility; also, that while the cover may be readily detached from the casing A by moving the enlargement $k$ of the stud $j$ into coincidence with the offset portion of the keyhole-slot $f$ in lug $e$ and raising the stud out of engagement with the lug, yet there is no liability of the cover casually becoming detached. The cover is preferably of metal and may be slotted, as shown in Fig. 3, or imperforate, as desired. It is made detachable in order to give place to another and different cover when desirable. This advantage will be appreciated when it is remembered that different covers are suitable for different purposes—that is to say, one cover may be adapted to facilitate the heating of flat-irons, another to receive a pot or kettle, and another for meat-broiling purposes.

In using my improved stove the charcoal is placed in the pot C above the grate $g$, while the cover E rests in a position at one side of the casing A. The cover is then restored to the position shown in Fig. 2, the charcoal having been ignited in the meantime. The coincident apertures *a h* of the casing A and pot C serve to supply the draft necessary to support combustion of the charcoal, and the said draft may be readily regulated by closing the damper *b* to a greater or less extent. Said apertures *a h* also permit of the ready removal of ashes when the same collect in the pot C below the grate *g*.

By virtue of the construction described it will be observed that when worn or broken or burned out the pot C may be readily removed from the casing A and a new pot as readily placed in and used in conjunction with the said casing; also, that when the cover E is worn, burned, or broken it may be removed and its place taken by a new cover.

In addition to the advantages stated my improved stove is compact and adapted to be conveniently carried from place to place and is susceptible of being readily cleaned, the pot C being removed for the latter purpose, when necessary.

I have entered into a detailed description of the construction and relative arrangement of parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my claims.

Having described my invention, what I claim, and desire to secure by Letters Patent, is—

1. In a portable stove, the combination of a metallic casing closed at its lower end and open at its upper end, and having an opening adjacent to its bottom, a pot of fire-resisting material arranged in the casing and on the bottom thereof, and having a grate at an intermediate point of its height, and an opening below said grate, registered with the opening in the casing, and also having the exterior flange *i* snugly fitting in the casing, and the exterior recess below said flange and above the grate whereby the space D is formed, a suitable cover on the casing, and a damper connected to the casing for controlling the opening therein.

2. In the portable stove described, the combination of a metallic casing closed at its lower end and open at its upper end, and having an opening adjacent to its bottom, and a lug on its side adjacent to its upper end; said lug being provided with a vertically-disposed keyhole-slot, a cover having a depending stud adjacent to its perimeter, journaled in the keyhole-slot of the lug, and provided at its lower end with an enlargement, a handle connected to the casing, a damper also connected to the casing, and arranged to control the opening therein, and a pot of fire-resisting material arranged in the casing and on the bottom thereof, and having a grate at an intermediate point of its height, and an opening below said grate, registered with the opening in the casing, and also having the exterior flange *i* snugly fitting in the casing, and the exterior recess below said flange and above the grate whereby the space D is formed.

In testimony whereof I have signed my name to this specification in the presence of two subscribing witnesses.

T. O'BRIEN.

Witnesses:
   Thos. O'Neail,
   T. Scott Davidson.